March 14, 1961 C. R. DOTY ET AL 2,975,228

DATA TRANSMISSION SYSTEM

Filed Oct. 6, 1954 6 Sheets-Sheet 1

INVENTORS
CHARLES R. DOTY
ROY J. SMITH
LAWRENCE A. TATE
VINCENT H. CACKOWSKI

BY [signature]

ATTORNEY

DATA TRANSMISSION SYSTEM

Filed Oct. 6, 1954 6 Sheets-Sheet 2

*INVENTORS*
CHARLES R. DOTY
ROY J. SMITH
LAWRENCE A. TATE
VINCENT H. CACKOWSKI

BY [signature]
ATTORNEY

INVENTORS
CHARLES R. DOTY
ROY J. SMITH
LAWRENCE A. TATE
VINCENT H. CACKOWSKI
BY
ATTORNEY

TRANSMITTING OSCILLATOR

RECEIVER AMPLIFIER

RING START

*INVENTORS*
CHARLES R. DOTY
ROY J. SMITH
LAWRENCE A. TATE
VINCENT H. CACKOWSKI
BY
ATTORNEY

March 14, 1961 C. R. DOTY ET AL 2,975,228

DATA TRANSMISSION SYSTEM

Filed Oct. 6, 1954 6 Sheets-Sheet 5

*INVENTORS*
CHARLES R. DOTY
ROY J. SMITH
LAWRENCE A. TATE
VINCENT H. CACKOWSKI

BY [signature]

ATTORNEY

FIG. 8

| | 12 | X | O | R | 1 | 2 | 4 | 8 |
|---|---|---|---|---|---|---|---|---|
| A | — | | | — | — | | | |
| B | — | | | — | | — | | |
| C | — | | | | — | — | | |
| D | — | | | — | | | — | |
| E | — | | | | — | | — | |
| F | — | | | | | — | — | |
| G | — | | | | | — | | — |
| H | — | | | — | | | | — |
| I | — | | | | — | | | — |
| J | | — | | — | — | | | |
| K | | — | | — | | — | | |
| L | | — | | | — | — | | |
| M | | — | | — | | | — | |
| N | | — | | | — | | — | |
| O | | — | | | | — | — | |
| P | | — | | | | — | | — |
| Q | | — | | — | | | | — |
| R | | — | | | | — | | — |
| S | | | — | — | | — | | |
| T | | | — | | — | — | | |
| U | | | — | — | | | — | |
| V | | | — | | — | | — | |
| W | | | — | | | — | — | |
| X | | | — | | | — | | — |
| Y | | | — | — | | | | — |
| Z | | | — | | — | | | — |
| 12 | — | | | | | | | |
| 11 | | — | | | | | | |
| 0 | | | — | | | | | |
| 1 | | | | | — | | | |
| 2 | | | | | | — | | |
| 3 | | | | — | — | — | | |
| 4 | | | | | | | — | |
| 5 | | | | — | — | | — | |
| 6 | | | | — | | — | — | |
| 7 | | | | — | | — | | — |
| 8 | | | | | | | | — |
| 9 | | | | — | — | | | — |
| END OF CARD | | | | | — | — | — | |
| & START TELEPHONE | | | | | | — | — | — |
| END OF TRANSMISSION | | | | — | — | — | — | — |
| RESTART | | | | | — | | — | — |
| SPACE | | | | — | | | | |

INVENTORS
CHARLES R. DOTY
ROY J. SMITH
LAWRENCE A. TATE
VINCENT H. CACKOWSKI
BY [signature]
ATTORNEY United States Patent Office 2,975,228

Patented Mar. 14, 1961

2,975,228

DATA TRANSMISSION SYSTEM

Charles R. Doty, Poughkeepsie, Roy J. Smith, Wappingers Falls, and Lawrence A. Tate and Vincent H. Cackowski, Poughkeepsie, N.Y., assignors to International Business Machines Corporation, New York, N.Y., a corporation of New York Filed Oct. 6, 1954, Ser. No. 460,662

17 Claims. (Cl. 178—3)

This invention relates to data transmitting machines, and more particularly to a machine for duplicating statistical cards at remote locations.

In many record keeping applications, field data is punched is statistical cards of the well known IBM type and then compiled by a centrally located office. This data may be transmitted from the field to the central office through any one of numerous methods, ranging from mail and messenger service to telegraphically or radio transmitted information—depending upon the required speed of transmission. In one of the more common data transmitting methods, field data in perforated card form is translated to perforated paper tape which is then telegraphically transmitted to a central office, where it is again punched into a tape from which it is retranslated into cards.

It is the first object of this invention to provide a data transmitting machine of the subject type, wherein data in perforated cards may be directly duplicated at a distant location, without the requirement of first punching the information into a tape.

In transmitting data in card form, there is always the problem of determining whether or not correct information has been received at the remote location, and it is a further object of this invention to provide an improved data transmitting mechanism that is provided with error detection devices.

It is a further object of this invention to provide a device for transmitting statistical cards from one location to another wherein the statistical code at the transmitter is translated to a transmittal code and wherein an error detecting check may be made to determine the correctness of transmitted data.

It is a further object of this invention to provide a machine of the subject type, wherein the transmitter and the receiver are synchronized by a synchronizing pulse preceding the character bits for each character being transmitted.

It is a further object of the subject invention to provide a machine of the subject type, wherein in order to insure the accuracy of transmission of numerical characters (single hole punches in an eighty column statistical card) the machines are arranged to stop immediately if a blank column is read at the transmitter.

It is a further object of this invention to provide a machine of this subject type, wherein an end of card signal is sent from the transmitter to the receiver, immediately following the last column to be sent from the transmittal card; and wherein an end of card signal is automatically transmitted following the transmission of data punched in the eightieth column of a transmittal card.

It is a further object of this invention to provide a machine of the subject type wherein the end of card signal is used as a check test to determine if the correct number of card columns have been punched.

It is a further object of this invention to provide a machine of the subject type wherein the receiver is equipped to test the odd or even number of bits of which each character received is composed.

It is a further object of this invention to provide a machine of the subject type, wherein the transmitter is under control of the receiver whereupon each time the receiver completes the punching of a card to the satisfaction of the column check, the character check and blank column check, etc. a signal will be sent back to the transmitter to cause it to release the transmitted card and start transmitting the next one.

Other objects of the invention will be pointed out in the following description and claims and illustrated in the accompanying drawings, which disclose by way of example, the principle of the invention and the best mode, which has been contemplated of applying that principle.

With reference to the drawings:

Fig. 8 is a chart of signals available to the machine operators.

Basically, the objects of this invention are carried out by reading a column of a card perforated in a well known eighty column statistical code in a unit time, translating it into a different or transmittal code, coordinating elements of the transmittal code with timed pulses from an electronic ring during the same unit time whereby in every unit of time, or cycle, certain combinations of pulses are available for energizing a transmission means.

The transmission means, in turn, carries the pulses to a receiver which re-translates the transmittal code to eighty column code and selectively energizes punch magnets so that the information read at the transmittal stations is duplicated at the receive station.

Figure 1:
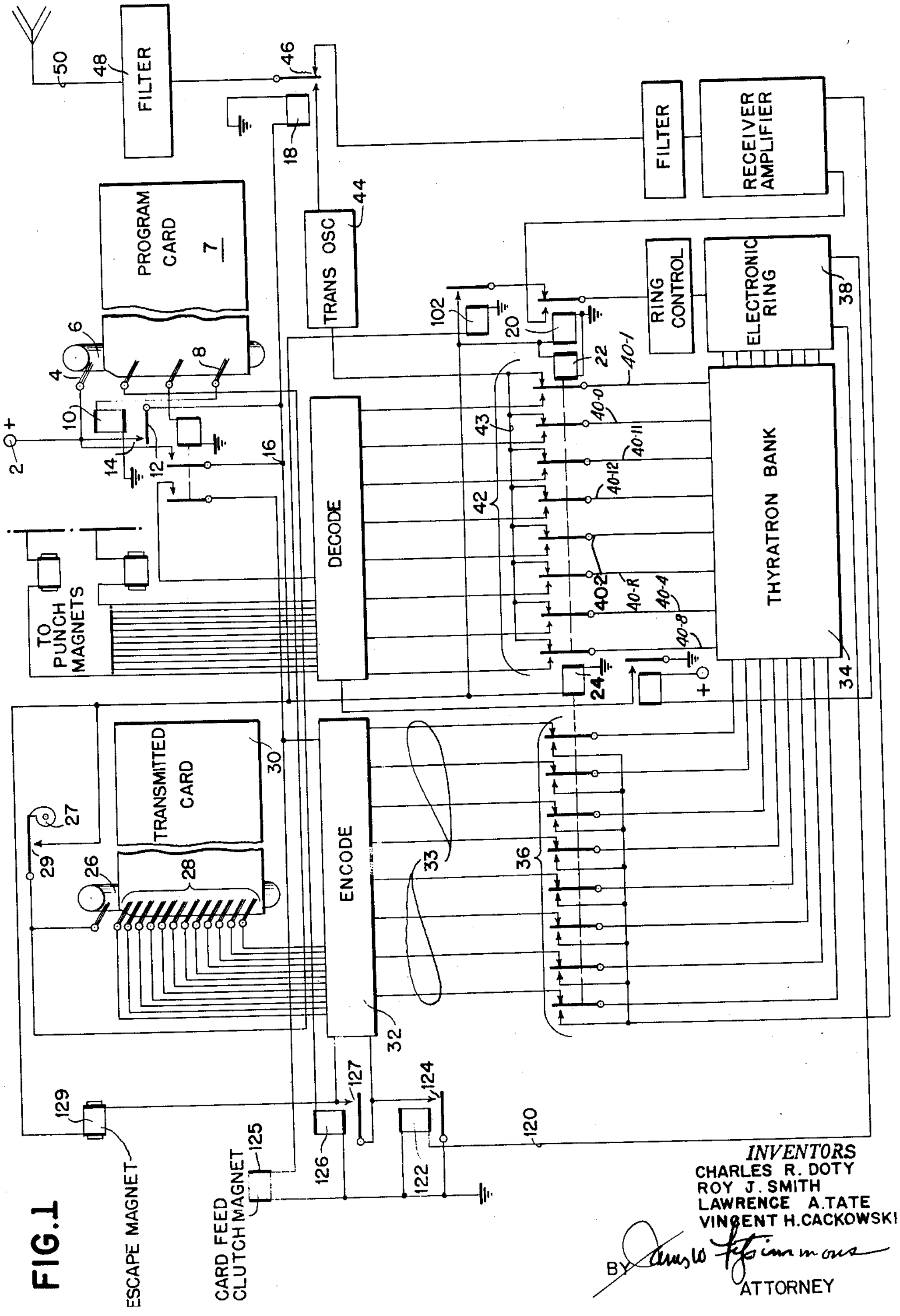
Fig. 1 is a schematic view of one of two identical transceivers in the transmit position.
Figure 2:
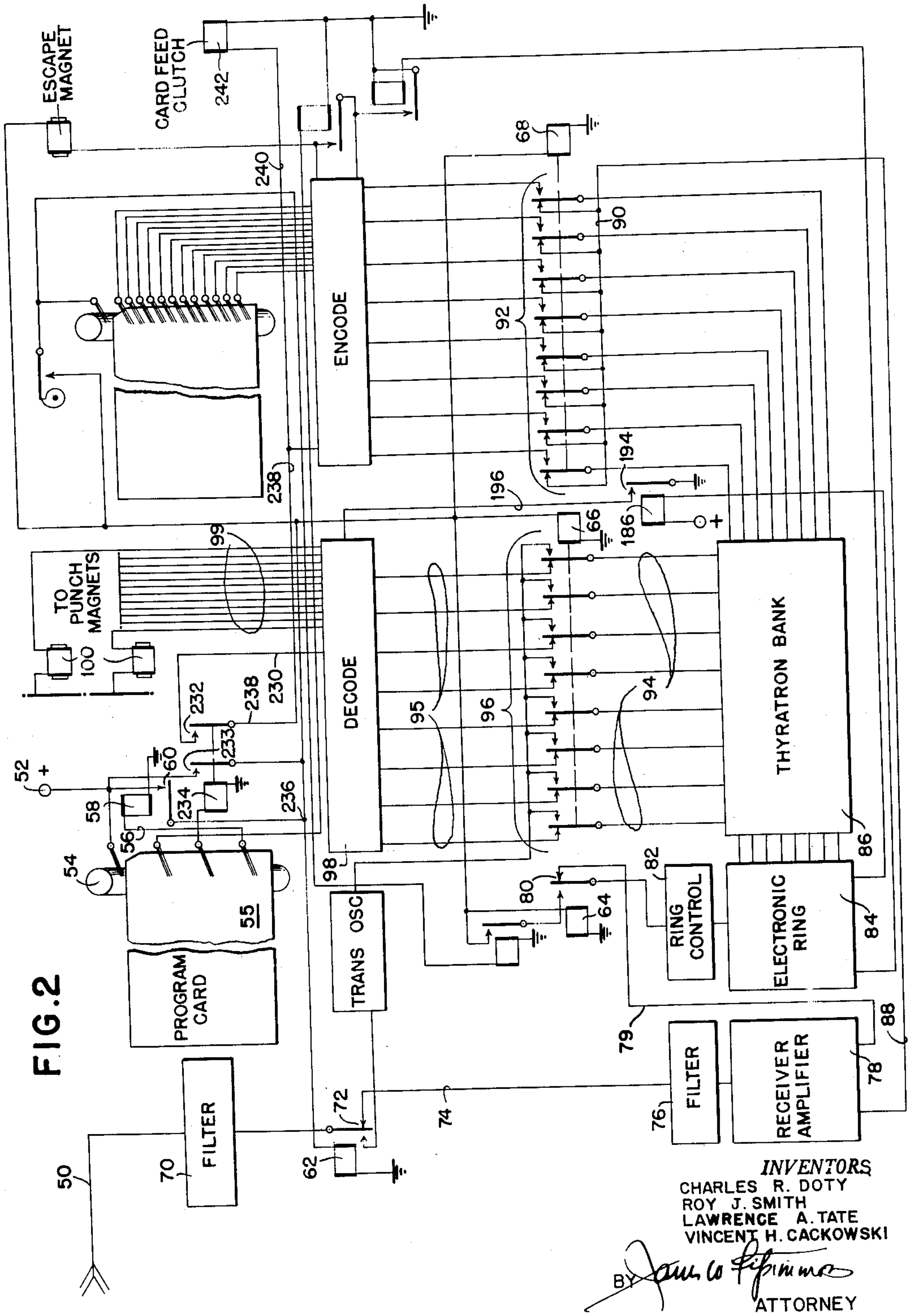
Fig. 2 is a schematic view of one of the transceivers in receive position.

With particular reference to Figs. 1 and 2 of the drawings, a summary description of the operation of this improved apparatus will be given in block or schematic form, in order to place the elements of this invention in the proper perspective. The individual elements will then be described in greater detail.

Primarily, it should be pointed out that two substantially identical mechanisms, hereinafter called "Transceivers" for purpose of identification, are provided, either one of which is designed to transmit or receive information depending on its assigned program.

In the embodiment shown in Fig. 1, the transceiver is shown set as a transmitter, while in Fig. 2, it is shown set as a receiver.

*Transmitter*

Starting at the transmitter, Fig. 1, a positive potential source is indicated at terminal 2 and the latter is connected at brush 4 to a common contact roll 6 of a device for reading holes in statistical cards. Such a device for example, is the program drum reading device of a card punch of the type shown and described in U.S. patent to E. W. Gardiner et al. 2,647,581. With this arrangement, and providing a hole is suitably located in a program card 7 for sensing, a brush 8 will wipe the contact roll 6 through a hole in the card to energize the relay 10 which has its opposite terminal at ground potential. With the energization of relay 10, the armature 12 is closed against terminal 14 whereby positive current from terminal 2 is available at terminal 16, to energize the hereinafter described circuits:

Specifically, from terminal 16 current is available simultaneously to pick up transmit relays 18, 20, 22 and 24, each of which has its opposite side connected to ground. Furthermore, current is available from terminal 16 upon cam 27 closing switch 29, to the common contact roll 26 at the read station of a card punch as described in the aforementioned U.S. Patent 2,647,581 the read brushes 28 sense punchings in the statistical card 30 and thereby set up control relays in an encoding matrix 32 which translates information read from the card in the well known 80 column code to a new code, which, while not limited thereto, is in the particular embodiment hereinafter described, a combination of some number of eight energized contacts representing a character in the 80 column code.

After being encoded in the matrix 32 outputs are available at selected conductors 33, leading from the encoding matrix 32 to a thyratron bank 34 through the contacts 36 of transmit relay 24. To facilitate the tracing of signal circuits, contacts 36 and 46 are shown in Fig. 1 in the energized or transmit position. The thyratron bank 34, as hereinafter more particularly described, comprises eight thyratron tubes each having a pair of grids; one of which is connected respectively to the encoding matrix 32 through the contacts 36 and the other of which is connected respectively to an electronic ring 38. The purpose of the electronic ring is to condition in progressive sequence, the second grids in the eight thyratron tubes so that a pulse will be available at leads 40 when both grids of the same tube are simultaneously energized. Immediately following ignition of a thyratron and before ignition of next thyratron, the first thyratron is quenched by a well known plate circuit interrupting tube controlled from the driving lines of the ring.

A pulse at leads 40, after passing through contacts 42, shown energized to the transmit position, goes along the common conductor 43 and through a transmitting oscillator 44 through contact 46 now closed by magnet 18 through filter 48 and out on the transmission line 50. The pulses are serially fed into conductor 43 by the timed operation of the electronic ring 38.

While the transmission means described in this application is a transmitting oscillator, it must be realized that such a means has been chosen merely for illustrative purposes, and it is not intended to be a limitation on the scope of this invention. Obviously, any other signal transmitting medium other than radio, as shown would suffice; of which tetlegraph circuits and telephone circuits are examples.

The transmititng oscillator 44 is fired by pulses from the thyratrons in such a way that first a synchronizing pulse and then some combination of eight code pulses will be sent over the transmission line 50, each time a card column is read at the read brushes 28 of the transmitter.

*Receiver*

The receiver, as heretofore stated, is substantially identical to the transmitter. However, in a receiver, the program card is set up for a receive condition and would contain only those perforations necessary for controlling the punch and none that, upon being read, would pick up the transmit relays or magnets (as described with respect to Fig. 1) and accordingly, the transmit magnets of the receiver would remain de-energized and the switches controlled thereby would be in the normal or receive position.

With particular reference to Fig. 2, a current from the terminal 52 would go to the common roll 54 of the program card 55 of the card punch. Since programming is not needed for receiving there would be no holes in the program card, a current would not be available at the conductor 56, and accordingly, the relay 58 would not pick up, and it follows that contact 60 would remain open, whereupon the transmit relays 62, 64, 66, 68 are not energized and the transceiver is in a receive position.

Under these circumstances, the pulses sent over the transmission line 50 would be received at filter 70 and conducted through the normally closed side of contact 72 and through conductor 74 to filter 76 and then into the receiver amplifier 78.

The first of the pulses (called the synchronizing pulse) transmitted over line 70, after it leaves the receiving amplifier 78, goes over conductor 79 through the normally closed contact 80 of relay 64 to the ring control 82 which starts the electronic ring 84 to energize in progressive sequence one of two grids of each of the eight thyratron tubes in the thyratron bank 86. All the other pulses in the group, individually, after passing through the receive amplifier are transmitted over conductor 88, common conductor 90, through all of the normally closed contacts 92 of the relay 68, into the thyratron bank 86 to energize simultaneously one grid of all the thyratron tubes.

With this arrangement there would be a possibility—for each card column read—of one of the grids in each of the thyratrons being energized for eight pulses—or for some number of pulses up to eight, and during the same unit time, the other grid of each of the thyratrons would be energized in progressive sequence by the electronic ring 84 and, when the two grids of one tube were energized simultaneously, the individual thyratron would fire, sending a pulse to one of the leads 94 and through the respective one of the normally closed contacts 96 of relay 66 to the decoding matrix 98. In the decoding matrix 98, a combination of selected ones of the eight pulses of one cycle would be changed to selected ones of twelve pulses for 80 column statistical code and they would energize in progressive sequence and hold simultaneously, through conductors 99, selected punch magnets 100 in the card punch, to reproduce in a card column at the receiver, the information which had been contained in the corresponding card column at the transmitter.

This cycle of operation continues so long as a card is in read position at the transmitter and provided the transmitter program card is punched for transmit: that is, to reiterate, the brushes 28 sense each of the twelve bit positions of the card column and translate the information (in the encode matrix) to an eight bit code which is then transmitted over the line to the receiver; the receiver interprets the eight bit code and retranslates to twelve bit code to operate the punch magnets at the punch station of the receiver.

When all 80 columns of the transmittal card have been read and transmitted, or as many columns thereof as specified by the program card; and punched into a card at the receiver, then a signal is sent from the receiver back to the transmitter to let the transmitter know that the full 80 columns or the full number programmed have been punched at the receiver. This signal (later described in detail) is produced either automatically when the program card at the transmitter reaches column 81, or under control of punchings in a specified column of the program card.

*Detailed description*

The following more detailed description relates to the operation of components in order of their occurrence in the previous summary description.

*Card punch*

Particular reference is made to U.S. Patent 2,647,581 for a complete description of the structure and operation of a card punch suitable for use with the present invention. It is sufficient to say that a key punch comprises; a read station having pins for reading simultaneously the 12 rows of a statistical card, one card column at a time; a punch station having punch magnets selectively operable to punch simultaneously holes in selected rows of a statistical card, one card column at a time; a program drum for carrying a program card punched to provide electrical pulses for governing some operations of the keypunch; a card feed clutch, which is a well known one revolution clutch mechanism including a magnet energizable for operating the feed clutch through one cycle; a card punch clutch conditioned for operation by an escape magnet energizable for operating an escapement mechanism to advance a card through one card column.

When the escape magnet is operated, a statistical card is fed one card column at a time past the read and punch stations of the keypunch. That is, separate cards being at each station, each card will be fed one card column at a time in response to the operation of the escape magnet until all the card columns have passed under a particular station, then the card feed clutch is energized and the card at the read station is sent to a stacking hopper; while simultaneously, the card at the punch station is sent to the read station and a new card is fed from a feed hopper to the punch station. In the subject apparatus, when programmed to transmit information, only the read station of the transmitting card punch and the punch station of the receiving card punch would be programmed for operation at any one time.

During one cycle, as conditioned by the energization of the escape magnet, and depending upon the instructions from the program card, the card punch machine is conditioned to read a card column at the read station and punch information into a card column at the receive station.

In any event, and for the purpose of this description, it is sufficient to realize that when the escape magnet is energized, a card column advance takes place at a transmitting station and the punch station; the read pins read the card column at the transmitting card punch and selected information is punched into the corresponding column at the receiving card punch.

*Encoding matrix*

As has heretofore been mentioned, the purpose of the encoding matrix is to translate the eighty column statistical code to a transmittal code. To accomplish this result, information which is read from the card at the read station of the transmitting card punch is used to pick up certain relays in a permutation set up. It should be noted that since the read pins of the card punch carry a pulse for such a brief interval, either holding circuits must be provided, or the encoding magnets must be of the latching type that stay latched until unlatched on the next card read cycle. For purpose of simplicity the magnets of the subject apparatus will be considered as the latching type.

Figure 3:
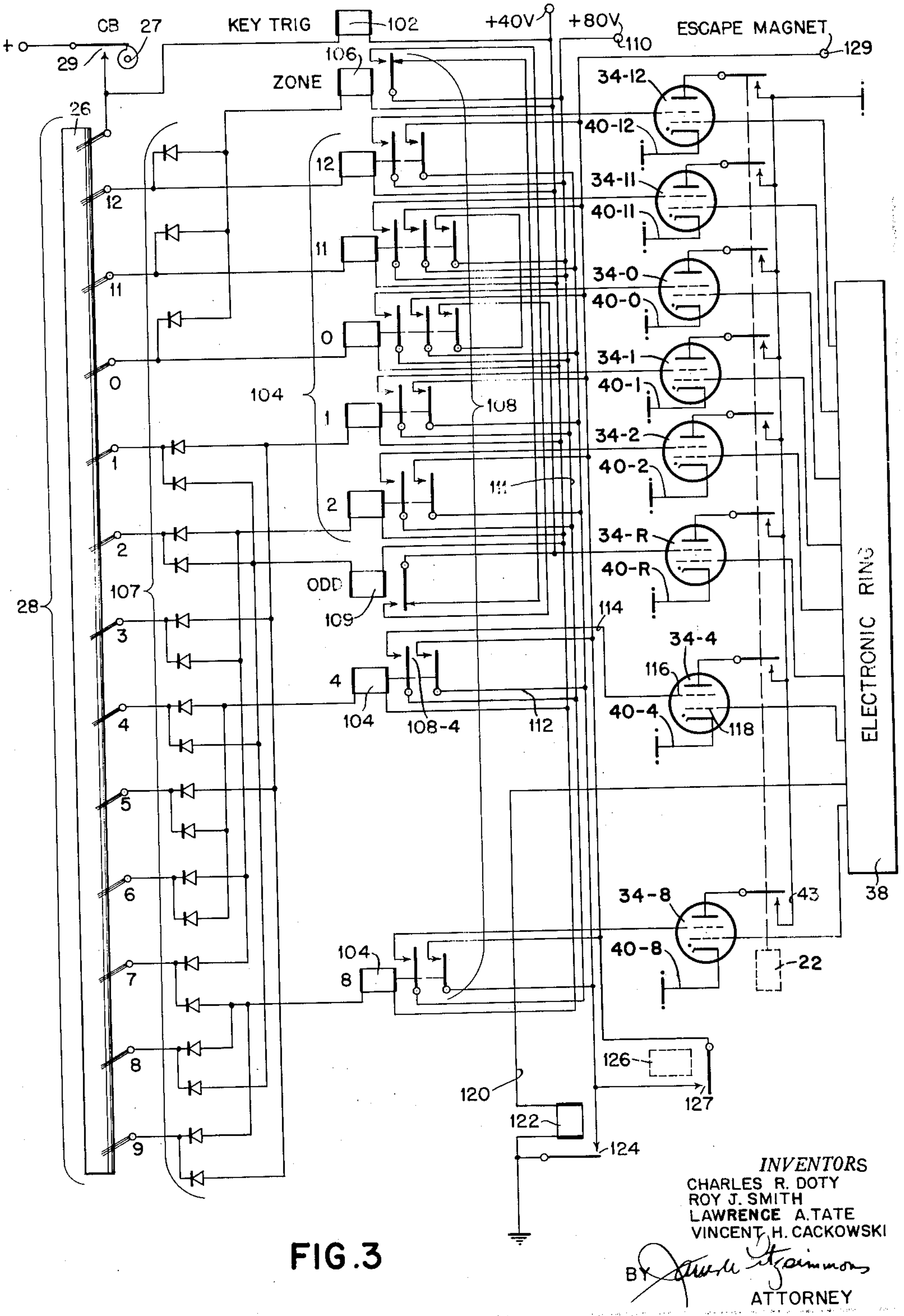
Fig. 3 is a schematic view of an encoding network.

With reference now to Fig. 3 of the drawing, the cam 27 is shown positioned to close switch 29 to energize the common bus 26 and simultaneously energize both the Key Trigger magnet 102 which starts the Electronic Ring 38 (see Fig. 1) and any of the brushes 28 in contact with bus 26 through card holes.

From the common bus 26, a circuit is completed through each of the brushes 28—provided there are corresponding card perforations—to pick up selected encoding relays 104. For example, the brushes reading the 12, 11, 0 perforations, simultaneously energize selectively one or more of the encode magnets 104–12, 11 or 0 and also the Zone relay 106. The pins or brushes reading perforations 1 through 9 energize selectively combinations of the 104–1, 2, 4 and 8 magnets (in one embodiment) to equal the numeric value of punchings in the column read at the read station. The rectifiers 107 are provided to prevent feed back circuits. Further, if the combination of punchings that make up the numeric value read at the read brush is an odd number (in the particular embodiment disclosed), then for checking purposes, the Odd relay 109 is also selectively energized in accordance with a preplanned wiring scheme.

Energization of an encoding relay 104 closes the corresponding encoding contacts 108.

In tracing the circuitry through an encoding contact 108, it will be noted that current from terminal 110 (80+ volts) is available through the normally closed encoding contact to bias one of the grids of selected ones of the eight thyratron tubes 34—depending on which of the encoding contacts 108 are closed.

As a specific example, assume contact 108–4 has been closed, then a circuit has been completed as follows: From +80 volts of terminal 110 along conductors 111 and 112 through contact 108–4, along conductor 114 to grid 116 of thyratron 34–4.

Figure 4:
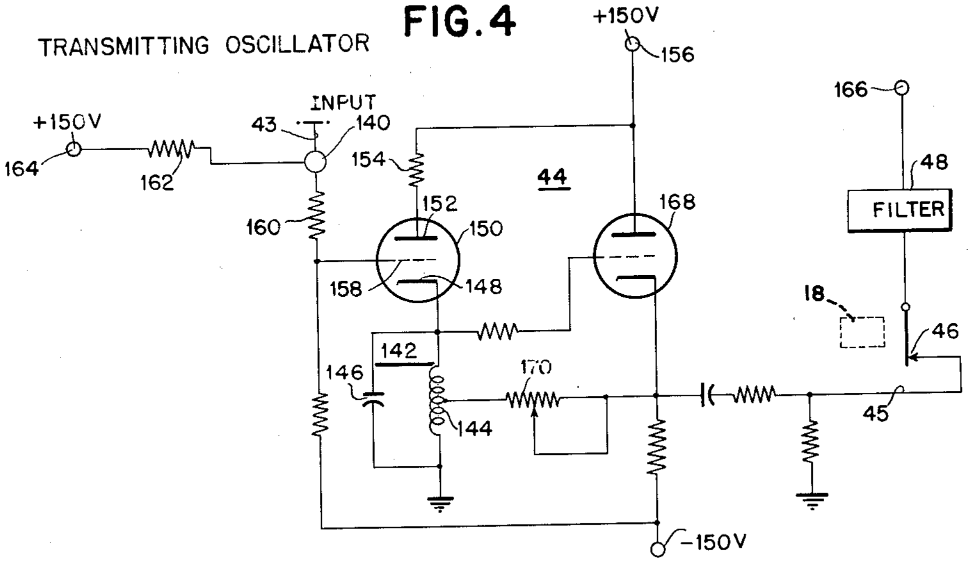
Fig. 4 is a schematic view of a transmitting oscillator.

With this circuit set up, then when the electronic ring 38 energizes grid 118 of tube 34–4, that tube is rendered conductive and a pulse is made available through lead 40–4 which, as shown in Figs. 1 and 4, passes through contact 42–4 and along conductor 43 to start the transmitting oscillator 44. For the purpose of identification these thyratron tubes 34 or their electrical equivalents will be referred to in the claims and other parts of the description as dual series switching devices by which is meant a device having two contacts in series, both of which must be conditioned for current flow before a circuit is established through the tube.

*Card feed*

Before tracing the transmitted pulse over the transmission line to the receiver, it should be pointed out at this time, that the electronic ring 38 (Fig. 3) in making one cycle is arranged to send a pulse through lead 120 to relay 122 thereby closing contact 124. This action permits a pulse to pass through a blank column checking circuit, whereupon if any one or more of the encoding relays 104 has been picked up, a circuit will be closed to the escape magnet 129 to condition the card punch for the next cycle, whereby a new card column will be moved into read position in preparation for the next transmitting cycle. If one or more contacts of encoding relays 104 are not closed the above circuit will not be completed and the escape magnet will not be energized indicating a blank column, and the mechanism will be shut down.

The one exception to this statement is if the program card has been punched for "blank column detection" whereupon, irrespective of whether a pulse gets through the blank column checking circuit of Fig. 3, relay 126 will be energized, directly from the program card, thus energizing the Escape magnet, and operate the punch clutch magnet through contact 127, rather than through the blank column checking network. This, of course, is not a normal course of operation, but rather a special programmed condition.

*Transmission oscillator*

Referring again to Fig. 1, it has been shown that when the thyratrons 34 are fired, a pulse passes through leads 40 and through the contacts 42 of relay 22, when in their transmit position, to conductor 43 and along conductor 43 to the transmitting oscillator 44. The latter, when conditioned, oscillates and send signals over the transmission line in registration with current flow through the thyratrons. An embodiment of the transmitting oscillator is shown in Fig. 4 of the drawings, wherein the lead 43 is shown connected to an input terminal 140.

A tuned oscillating circuit 142 having an inductance 144 and a capacitance 146 is shown connected to ground via one end to the inductance and capacitance the other ends of which are connected to the cathode 148 of a tube 150. The plate 152 of tube 150 is connected through a suitable resistor 154 to a positive potential source 156. With a suitable adjustment in voltage of the grid 158 of tube 150, current will flow through that tube and through the oscillating circuit 142 to ground. Grid 158 is also connected through suitable resistors 160 to the input terminal 140. The latter terminal is also connected through a resistor 162 to terminal 164 held at +150 volts.

With this arrangement of parts, when current flows through any one of the thyratrons in the bank 34, the potential of the input terminal 140 is reduced pulling down the voltage at grid 158 thereby momentarily stopping current flow through the tube 150. This causes oscillating circuit 142 to oscillate and send an oscillating sine wave through filter 48 to terminal 166.

In order to keep the oscillator swinging at full capacity, a second tube 168 and feed back resistor 170 are normally added in the circuit to act as a ballast. Usually, the tubes 150 and 168 are within the same envelope as a twin triode, of which one commercial form is known as number 6350.

*Filter*

The sine wave oscillations emanating from the transmitting oscillator 44 have been described as passing over a lead 45 and through contact 46, when closed, to the filter 48. The latter is a commercially available product, known as a band pass filter. In one embodiment, it has been found desirable to use a band pass filter having a passing frequency of 800 cycles, with a side band of 250 cycles.

It might be pointed out here that if the transmitting line is to be a telephone wire, which is known to have good passing characteristics between 600 and 2500 cycles, then it is possible to use 4 pairs of transceivers over the same telephone wire, with filters 48 being arranged in 500 cycle intervals. For example, an 800 cycle filter 48 would be used, also a 1300, an 1800, and 2300 cycle band pass filter. With this arrangement, it is possible to send simultaneously, four distinct messages over a telephone wire to individual receivers. The circuitry for such transmission is commonly known and need not be described in this patent application.

*Receiver*

The signals after being sent through filter 48 are transmitted over the transmission line 50 (Fig. 2), and are received at filter 70 in the receiver which is a commercially available band pass filter and is used to select which of the transmission frequencies is to be received.

From filter 70, the signal goes through normally closed contact 72 of relay 62, over conductor 74 to a second filter 76. This second filter 76 is commercially available and used in conjunction with filter 70 to reject unwanted signals.

*Receiver amplifier*

Figure 5:
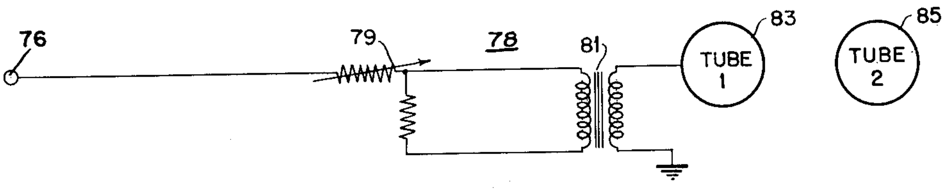
Fig. 5 is a schematic view of a receiving amplifier.

The receiver amplifier 78 (Fig. 5) comprises basically a variable gain control 79, a transformer 81 and a pair of tubes 83, 85. This circuitry is used to amplify the incoming signal, rectify it, and clip it so that it will be in proper form for the operation of the transceiver of Fig. 2 as a receiver.

The output from the receiver amplifier goes in parallel over conductor 79 through the contact 80 of the relay 64 to the ring control 82, and along conductor 88 to the common conductor 90, through the closed contacts 92 of relay 68 into the thyratron bank 86. It will be recalled that in performing this latter function, the receiver amplifier sends a pulse to one grid of all the thyratrons in the bank 86, thereby conditioning one grid of every tube each time a bit of information is received at the receiver amplifier.

*Ring start*

It has been pointed out that the pulses from the receiver amplifier go through contact 80 to the ring control 82. The purpose of the first or synchronizing pulse in any cycle of intelligence transmitted over the line 50 is to start the electronic ring for conditioning the second grids of the thyratron tubes in bank 86 in progressive sequence.

Figure 6:
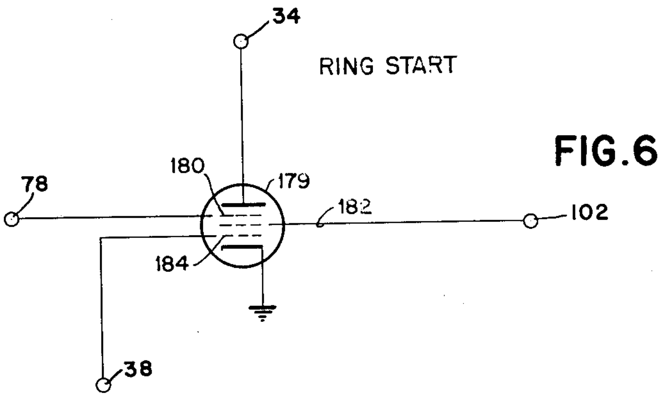
Fig. 6 is a schematic view of an electronic ring starting circuit.

The ring start comprises, essentially (Fig. 6) a pentode tube 179 wherein the three grids are connected as follows: Grid 180 is connected to the receiver amplifier 78 and conditions the tube 179 for passing current provided the grid 182 is held at a potential which will permit the tube to conduct. Actually, grid 182 is under the control of the transmit-receive switches (not shown), of the transceiver so that when the switches are thrown to the receive position, grid 182 is held at such a potential that just as soon as a receive signal is placed on grid 180 of the tube, it will conduct current and in turn, start the electronic ring 84. The grid 184 is connected in the ring circuit in such a manner that the tube cannot fire again during one cycle of the electronic ring, and accordingly, the ring must go through a complete cycle, and then settle down before it can be started again, by a pulse passing through the tube 179. This is commonly understood circuitry, and it is felt that further description is unnecessary in the present description.

On the other hand, if the ring control is used to start the ring when the transceiver is acting as a transmitter, then grid 180 is held at such potential that a pulse sent to grid 182 by key trigger (see equivalent 102, Fig. 1) will cause the tube to conduct and start the electronic ring. In either event, however, the grid 184 shuts down the tube preventing more than one pulse for a cycle of the electronic ring.

*Electronic ring*

The electronic ring 84 is identical to ring 38 in Fig. 1 and its basic structure is fully described in the "Proceeding of IRE," August 1948 as the "Leslie" Ring. As stated above, the purpose of the ring is to sequentially condition the second grids in the bank of thyratron tubes, in such a manner that, provided the first grid has been conditioned by a pulse from the receive amplifier, that thyratron tube will conduct, sending a pulse through conductors 94 and contacts 96 of relay 66 into the decode matrix 98, picking up certain relays to prepare circuits over conductors 99, for energizing the proper punch magnets 100.

It will be remembered that for each card column read at the transmitter, there may be a maximum of eight code pulses going over the transmission line, and accordingly, for every card column, there may be a maximum of eight individual code pulses through the conductors 94 and through contacts 96 to the decode matrix 98 and it is to be understood, therefore, that the relays in the decode matrix 98 may be the latching type that will be picked up by a pulse from the thyratron and held latched until unlatched, at a later stage of the cycle.

Incidentally, at the end of the ring cycle when all the selected code relays have been energized, a pulse from ring 84 then picks up relay 186 (Fig. 2). The contact 194 of which connects ground over conductor 196 to the decode circuit 98 for a purpose hereinafter described.

*Decode matrix*

Figure 7:
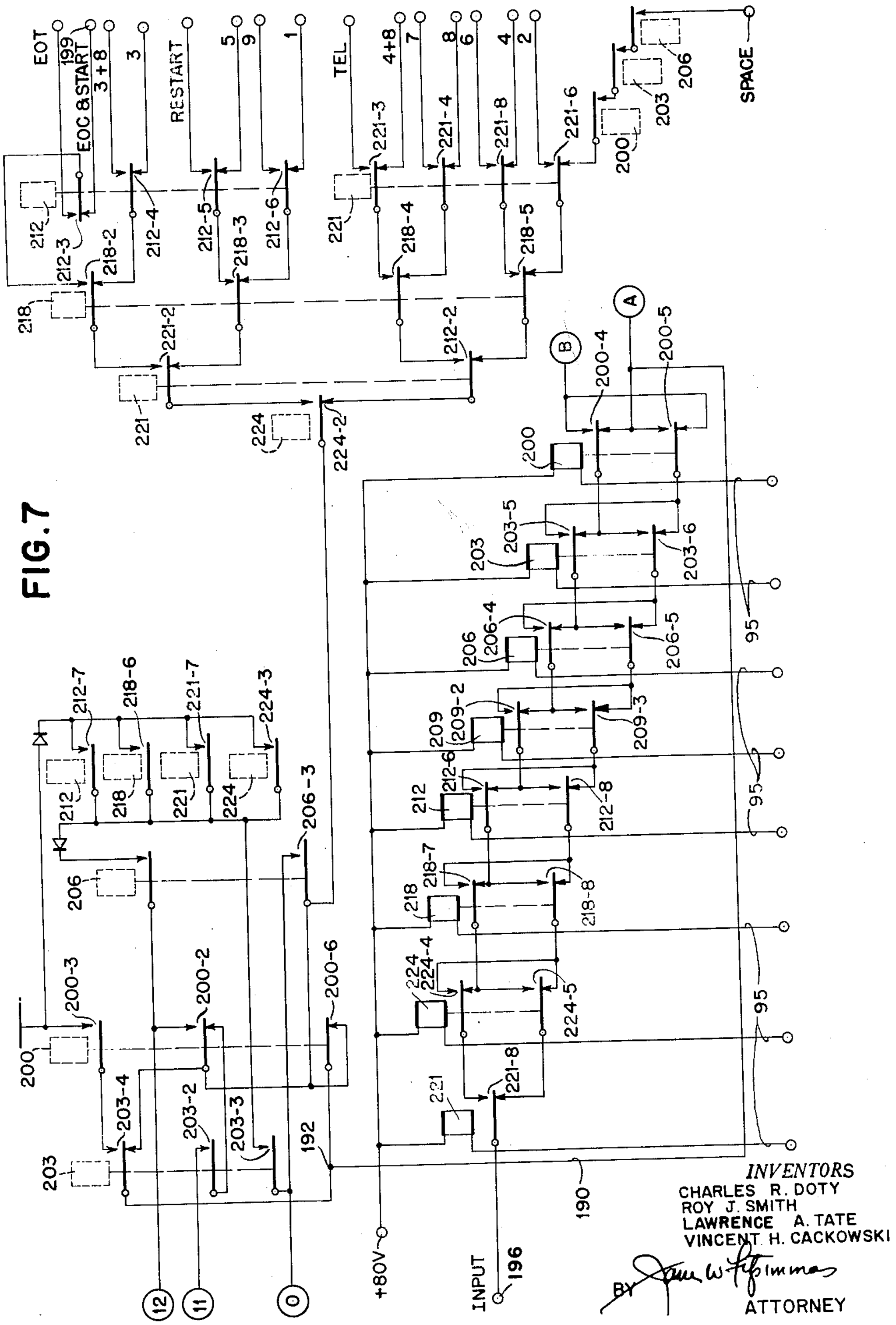
Fig. 7 is a schematic view of the decode network including a checking circuit.

With reference to a transceiver acting as a receiver (Fig. 2) it has already been stated that pulses from the thyratrons in the bank 86 pass through conductors 94 and through contacts 96 over conductors 95 which are individually connected one to each of eight relays in the decode matrix. These relays are shown in Fig. 7 of the drawings.

Within the decode matrix, relays 200, 203, 206, 209, 212, 218, 224 and 221 are shown having one side of their coils connected to a positive supply voltage (80 v.) and their other sides connected respectively one to each of the conductors 95.

For the purposes of simplicity, it is best to break down the decode matrix into two portions; the first of which deals with the checking portion. Specifically, depending upon the number of relays in the decode matrix that have been energized, a pulse which is sent into the input terminal at 196, by the energization of relay 186 will pass through the network of contacts and emit at terminal A or B depending on the number of relays picked. If the pulse emits at terminal B— this terminal is identified as a character check—it indicates that a good signal was not received and accordingly, the machine will be shut down. If the pulse emits at terminal A, it will pass along a conductor 190 to terminal 192 and then pass through a second network shown in the upper half of Fig. 7 to provide pulses at certain terminals, which in turn, are connected to the punch magnets in the card punch machine.

It is to be understood then, that two things take place in the decode matrix: one, certain of the relays are picked up in response to the firing of the thyratrons in bank 86; and two, a pulse is sent through a checking network and depending upon where it emanates, it will either energize terminals of selected punch magnets, or it will shut down the machine.

As hereinbefore mentioned, the pulse at the input terminal 196 is provided by the energization of relay 186 through means of the electronic ring 84. Specifically, a pulse from the ring at the end of the cycle energizes relay 186 closing a contact 194 permitting current to flow in conductor 196 to ground.

The pulse checking circuit in the lower half of Fig. 7 can be adjusted to any code checking test that may be desired, but in the particular embodiment disclosed, it is used as an odd even check, that is, unless an odd number of relays in the decode matrix having been picked up, the pulse entering at terminal 196, will not reach terminal A: instead it will be shunted to terminal B. This condition will be obvious by checking the circuit wherein it is apparent that if an even number of the relays are picked up, the pulse will go directly to terminal B.

For example, assume that relays 221 and 224 have been energized. Accordingly, a pulse from terminal 196 will come through to contact 221–8 which though normally open is now closed, and will go up to contacts 224–4 normally open and now closed, and then drop down to contacts 218–8 normally closed, through contacts 212–8 normally closed, through 209–3 normally closed, through 206–5 normally closed; through 203–6 normally closed; and through contacts 200–5 normally closed to terminal B. If any odd number of relays have been picked up, however, then the pulse will get through to terminal A, as now described in one instance. Assume for example, that relays 224, 218, 212 have been energized, now a pulse through terminal 196 will come through 221–8 normally closed through 224–5, normally open, now closed, to the upper terminal across to 218–7 normally open, now closed, down to terminal 212–8 normally open, now closed and up to terminal 209–2 normally closed, then to terminal 206–4, normally closed, terminal 203–5 normally closed, terminal 200–4 normally closed, and then to terminal A.

Now with respect to the upper half of Fig. 7, the pulse gets through terminal A and is conducted along conductor 190 to terminal 192 then depending upon which of the relays 200 through 221 that have been energized (e.g. the same ones energized in the checking circuit) the contacts in the upper half will conduct pulses to punch magnet terminals 1 through 9 and code 0, 11, 12 and to additional terminals which have special characteristics, hereinafter described, and pointed out in Fig. 8 in chart form.

When the terminals shown in Fig. 7 are connected to their respective punch magnets in the card punch machine, then upon the energization of any one of the punch magnets, a bail contact is closed which trips the punch clutch and the escape magnet. This will send the punch machine through one cycle and punch into the card at the proper column, the information conditioned by the energization of punch magnets. This operation is more particularly described in the aforementioned U.S. Patent 2,647,581.

*End of card*

When all the information which is desired to be transmitted has been sent to the receiver, an end of card code is sent over the transmission line. This pulse may be controlled by punching the transmitter program card at the desired column. After going through the decode network in the receiver, terminal 199 in Fig. 7 is energized. This terminal, in turn, is connected to the card punch and performs the following functions: The functions are well known and can be understood by reference to the aforementioned U.S. Patent 2,647,581. More specifically, the end of card code at the receiver causes (1) the receiver to skip to column eighty-one, if is is not already there; (2) it trips off number 12 punch magnet and thereby punches a 12 hole in column eighty-one; (3) while the punch clutch is punching the 12 hole in column eighty-one, the receiver is put in transmit position and the receiver encode network is switched to send a start code back to the transmitter (later described). After the 12 hole is punched in column eighty-one, the feed clutch is pulsed to feed a new card into punch position, and reset the program card to column one, so that the receiver is again placed in condition ready for the next signal transmitted from the transmitter.

After the transmitter has sent an end of card signal, it is programmed to drop back from the transmit to the receive position and wait for a start signal, which as has been mentioned, is sent from the receiver. The start pulse after passing through the decode network of Fig. 1 (similar to the one described in Fig. 2), energizes the card feed clutch magnet 125 in the transmitter and the transmittal card is advanced to a storage hopper and resets the program card to column one. A new card is then registered with the read brushes, whereupon the transmitter reads column one and starts a new transmission.

The End of Card code sent by and received back by the transmitter may be sent under control of the program card into the Encoding matrix 32. Specifically if holes are read in the program card (see chart Fig. 8) relays will be picked up in the Encoding matrix which will condition certain of the grids in the thyratron bank 34 and simultaneously the firing of the electronic ring 38 will send a predetermined code across the network already described to provide a pulse in the receiving machine at the End of Card terminal 199. This End of Card pulse (Fig. 2) continues through lead 230 to the contact points 232. Provided the receiver is in the proper column to receive an End of Card signal, the relay 234 will be energized by a pulse through the receiver program card and thereby close 232 and contacts 233. Contacts 233 provide a pulse at terminal 236 thereby energizing transmit-receive relays 62, 64, 66 and 68 changing the receiver to a transmitter. The pulse through contacts 232 passes along conductor 238 and puts a start signal into the Encode matrix and simultaneously passes along conductor 240 to actuate the card feed clutch 242.

The purpose of the foregoing description primarily is to set forth the operating circuitry for the improved data transmitting apparatus. With this circuitry, all the signals shown in chart of Fig. 8 are available to the operators of the machine. This is very important since the operators of the machines at opposite ends of a transmission line can signal one another through lights and buzzers concerning problems of transmission. Fig. 7, for example, shows the circuitry that would be utilized.

Accordingly, assuming both machines are turned on, the operator at the receiver can send a signal to the transmitting machine indicating that the receiver is ready for transmitted signals. This is accomplished simply by closing the proper encoding switch through any mechanical or manual means so that a 1–2–4 pulse is sent over the transmission line to the transmitter.

As another example of operation, the transmitting machine may be given a signal to restart after the receiver has skipped or duplicated certain card fields by sending a restart signal (1–4–8) from the receiver back to the transmitter. The important thing is that the operators are in electrical contact with one another and the machines maintain control one over the other through the circuitry described.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spiirt of the invention. It is the intention, therefore, to be limited only as indicated by the scope of the following claims.

What is claimed is:

1. An apparatus for duplicating statistical cards comprising a transmitting device operable in card column cycles and having means for reading information in a record card one card column at a time, a receiving device operable in card column cycles and having means for punching a record card column by column in response to the selective energization of its punch magnets, and means interconnecting said transmitting and receiving devices to effect the duplication in card column cycles of the informtaion in the record card located at said transmitting device in the second record card located in said receiving device irrespective of the distance separating said devices comprising, a message transmission medium, a plurality of transmitter dual series switching devices serially interconnecting said record card reading means with said message transmission medium, an encoding means for translating the information in one column of said record card located at said record card reading means to a different code for transmission, means interconnecting said encoding means with a first one of said switches in all of said dual series switching devices, means responsive to the operation of said card reading means for simultaneously conditioning for current conduction through the energization of said encoding means a plurality of said first switches, a sequentially operated timing device in said transmitter, means electrically interconnecting said timing device and a second switch of each of said dual series switching devices for cyclically conditioning for current conduction each of the second switches in said dual series switching devices one at a time, means responsive to the cyclic operation of the said card reading means for effecting the operation of said transmitter timing device through one cycle whereby electrical impulses are serially available at said message transmission medium in response to the simultaneous conditioning of the first and the sequential conditioning of the second switches of selected ones of said dual series switching devices, a plurality of receiver electrical switching devices serially interconnecting said transmission medium with said card punching device, a sequentially operated timing device in said receiving device, means interconnecting said receiver timing device with said receiver switching devices, and means responsive to impulses over said transmission medium for initiatng a cycle of said receiver sequentially operated timing device whereby for each card column read cycle at said transmission device, electrical pulses are available through said receiver switching devices to selectively energize punch magnets at said receiver card punch machine for duplicating in said receiver record card the information contained in said transmitter record card in card column cycles.

2. An apparatus for duplicating statistical cards comprising a transmitting device operable in card column cycles and having means for reading information in a record card one card column at a time, a receiving device operable in card column cycles and having means for punching a record card column by column in response to the selective energization of its punch magnets, and means interconnecting said transmitting and receiving devices to effect the duplication in card column cycles of the information contained in the record card located at said transmitting device in a second record card located at said receiving device irrespective of the distance separating said devices, comprising, a message transmission medium, a plurality of transmitter dual series switching devices serially interconnecting said record card reading means and said message transmission medium, an encoding means for translating information in one column of said record card at said card reading means to a different code for transmission, means interconnecting said encoding means with a first one of said switches in all of the said dual series switching devices, means responsive to the operation of said card reading means for simultaneously conditioning for current conduction through the energization of said encoding means a plurality of said first switches, a sequentially operated timing device in said transmitting device, means electrically interconnecting said timing device and the second switch of each of said dual series switching devices for cyclically conditioning for current conduction each of said second switches in said dual series switching devices one at a time, means responsive to the cyclic operation of the said card reading means for effecting the operation of said transmitter timing device through one cycle whereby electrical impulses are serially available at said message transmission medium in response to the simultaneous conditioning of the first and the sequential conditioning of the second switches of selective ones of said dual series switching devices, a decoding means for translating said transmittal code back to said statistical card code, means selectively energizing said punch magnets in said card punch means in response to electrical impulses available through said decoding mechanism, a plurality of receiver electrical switching devices serially interconnecting said transmission medium with said decoding means, means responsive to impulses over said transmission medium to condition for current conduction said receiver switching devices whereby for each card column read cycle at said transmission device electrical pulses are available through said receiver switching device and through said decoding means to energize selectively said punch magnets in said receiver card punching machine for duplicating in said receiver record card the information contained in said transmitter record card in card column cycles.

3. An apparatus for duplicating statistical cards comprising a transmitting device operable in card column cycles and having means for reading information in a record card one column at a time, receiving device operable in card column cycles having means for punching a record card column by column in response to the selective energization of its punch magnets, and means interconnecting said transmitting and receiving devices to effect the duplication in card column cycles of the information contained in the record card located at said transmitting device in a second record card located at said receiving device irrespective of the distance separating said devices comprising, a message transmission medium, a plurality of transmitter switching devices serially connecting said record card reading means with said message transmission medium, a sequentially operated timing device in said transmitting device, means electrically interconnecting said timing device and said switching devices, means responsive to the cyclic operation of said card reading means for effecting the operation of said transmitter timing device through one cycle whereby electrical impulses are serially available at said message transmission medium in response to the sequential conditioning of said switching devices, a decoding means for selectively energizing said punch magnets in said card punching means in response to electrical impulses available to said decoding means, a plurality of receiver dual series electrical switching devices serially interconnecting said transmission medium with said decoding means, a sequentially operated timing device in said receiving device, means interconnecting said receiver timing device with a first switch of each of said receiver dual series switching devices for cyclically conditioning for current conduction each of said first switches one at a time, means responsive to the first pulse of a cycle of electrical pulses across said transmission medium for initiating a cycle for said receiver sequentially operated timing device, circuit means interconnecting said transmission line and a second switch in each of said receiver dual series switching devices, and means responsive to all other pulses in the cycle across said transmission medium for simultaneously conditioning for current conduction said second switch in each of said dual series switching devices whereby for each card column read cycle at said transmission device electrical pulses are available through said receiver dual series switching devices and through said decoding means to selectively energize said punch magnets at said receiver card punching machine for duplicating in said receiver record card the information in said transmitter record card in card column cycles.

4. An apparatus for duplicating statistical cards comprising, a transmitting device operable in card column cycles and having means for reading information in a record card one column at a time, a receiving device operable in card column cycles and having means for punching a record card column by column in response to the selective energization of punch magnets therein, and means interconnecting said transmitting and receiving devices to effect a duplication in card column cycles of the information contained in said record located at said transmitting device in a second record card located at said receiving device irrespective of the distance separating said devices comprising, a message transmission medium, a plurality of transmitter switching devices serially interconnecting said record card reading means with said message transmission medium, an encoding means for translating information in one column of said record card at said card reading means to a different code for transmission, circuit means interconnecting said encoding means with said transmitter switching devices, means responsive to the operation of said card reading means acting through said encoding means to condition for current conduction said transmitter switching devices whereby electrical impulses are available at said message transmission medium, a decoding means for translating said transmittal code back to a statistical card code, means selectively energizing said punch magnets in said card punching means in response to electrical impulses available through said decoding means, a plurality of receiver dual series electrical switching devices serially interconnecting said transmission medium with said decoding means, a sequentially operated timing device in said receiving device, means interconnecting said receiver timing device with a first switch of each of said receiver dual series switching devices for cyclically conditioning for current conduction each of said first switches one at a time, means responsive to the first pulse of the cycle of electrical pulses across said transmission medium for initiating a cycle of said receiver sequentially operated timing device, circuit means interconnecting a transmission medium with said second switches in each of said receiver dual series switching devices and means responsive to all other pulses in the cycle across said transmission medium for simultaneously conditioning for current conduction said second switch in each of said dual series switching devices whereby for each card column read cycle at said transmission device electrical pulses are available through said recevier dual series switching device and through said decoding means to selectively energize said punch magnets at said receiver card punching machine for duplicating in said receiver record card the information contained in said transmitter record card in card column cycles.

5. An apparatus for duplicating statistical cards comprising a transmitting device operable in card column cycles and having means for reading information in a record card one card column at a time, a receiving device operable in card column cycles and having means for punching a record card column by column in response to the selective energization of punch magnets therein, and means interconnecting said transmitting and receiving devices to effect a duplication in card column cycles of the information contained in a record card located at said transmitting device in a second card located at said receiving device irrespective of the distance separating said devices comprising, a message transmission medium, a plurality of transmitter dual series switching devices serially interconnecting said record card reading means with said message transmission medium, an encoding means for translating information in one column of said record card at said card reading means to a different code for transmission, means interconnecting said encoding means with a first one of said switches in all of said transmitter dual series switching devices, means responsive to the operation of said card reading means for simultaneously conditioning for current conduction through the energization of said encoding means a plurality of said first switches, a sequentially operated timing device in said transmitting device, means electrically interconnecting said timing device and a second switch of each of said transmitter dual series switching devices for cyclically conditioning for current conduction each of said second switches in said dual series switching devices one at a time, means responsive to the cyclic operation of said card reading means for effecting the operation of said transmitter timing device through one cycle whereby electrical impulses are serially available at said message transmission medium in response to the simultaneous conditioning of said first and the sequential conditioning of said second switches of selective ones of said transmitter dual series switching devices, a decoding means in said receiving device for translating said transmittal code back to said statistical card code, means selectively energizing said punch magnets in said card punching means in response to electrical impulses available through said decoding means, a plurality of receiver dual series electrical switching devices serially interconnecting said transmission medium with said decoding means, a sequentially operated timing device in said receiving device, means interconnecting said receiver timing device with a first switch of each of said receiver dual series switching devices for cyclically conditioning for current conduction each of said first switches one at a time, means responsive to the first pulse of a cycle of electrical pulses across the transmission medium for initiating a cycle of said receiver sequentially operated timing device, circuit means interconnecting said tranmission line and a second switch in each of said receiver dual series switching devices, and means responsive to all other pulses in a cycle across said transmission medium for simultaneously conditioning said second switch in each of said receiver dual series switching devices whereby for each card column read cycle at said transmission device electrical pulses are available through said receiver dual series switching device and through said decoding means to selectively energize said punch magnets at said receiver card punching machine for duplicating in said receiver record card the information contained in said transmitter record card in card column cycles.

6. An apparatus for transmitting statistical card intelligence over a transmission medium comprising, a record reading device operable for reading information in a record card one column at a time, programming means for conditioning said reading device to emit electrical impulses in response to intelligence contained in any record card column, a plurality of switching devices interconnecting said record card reading means with said message transmission medium, a timing device for preparing said switching devices for conduction, said timing device being cycled each time a column is read, a feed mechanism having an escape magnet for feeding a record card one column at a time through said card reading device, means interconnecting said escape magnet and said timing device for pulsing said escape magnet to advance a record in said transmitting mechanism one card column each time said timing device is cycled, whereby electrical impulses are cyclically available at said message transmission medium in response to the conditioning of said switching devices under the control of said timing device and said reading means.

7. An apparatus for transmitting statistical card intelligence over a transmission medium comprising a device operable for reading information in the record card one column at a time, a plurality of transmitter dual series switching devices serially interconnecting said record card reading means with said message transmission medium, and an encoding means for translating the information in one column of said record card at said card reading means to a different code for transmission, means interconnecting said encoding means with a first of said switches in all of said transmitter dual series switching devices, means responsive to the operation of said card reading means for simultaneously conditioning for current conduction through the energization of said encoding means a plurality of said first switches, a sequentially operated timing device in said transmitter, means electrically interconnecting said timing device and the second switch of each of said transmitter dual series switching devices for cyclically conditioning for current conduction each of said second switches in said dual series switching devices one at a time, means responsive to the cyclic operation of said card reading means for effecting the operation of said transmitter timing device through one cycle, said encoding means comprising a plurality of relays selectively operable in response to impulses from said transmitting card reading device to condition simultaneously a plurality of electrical conductors, respectively, interconnecting said encoding means and said plurality of transmitting dual series switching devices, said transmitter dual series switching devices each comprising a thyratron tube having a pair of grids one of which is connected to said encoding means and the other of which is connected to said sequentially operated timing device, whereby electrical impulses are available at said message transmission medium in response to the simultaneous conditioning of said first grids and the sequential conditioning of said second grids of selected ones of said thyratron tubes.

8. An apparatus for transmitting statistical card intelligence over a transmission medium comprising a device operable for reading information in a record card one column at a time, programming means at said record card reading device for conditioning the same to emit electrical impulses in response to intelligence contained in one record card column, a plurality of transmitter dual series switching devices serially interconnecting said record card reading means with said message transmission medium, an encoding means for translating information in one column of said record card at said card reading means to a different code for transmission, means interconnecting said encoding means with a first of said switches in all of said transmitter dual series switching devices, means responsive to the operation of said card reading means for simultaneously conditioning for current conduction through the energization of said encoding means a plurality of said first switches, a sequentially operated timing device in said transmitter, means electrically interconnecting said timing device and the second switch of each of said transmitter dual series switching devices for cyclically conditioning for current conduction each of said second switches in said dual series switching devices one at a time, means responsive to the cyclic operation of said card reading means for effecting the operation of said transmitter timing device through one cycle, an escape mechanism having an escape magnet at said transmitting card reading device for feeding record cards one column at a time through said card reading device, means interconnecting said escape magnet and said transmitting timing device for pulsing said escape magnet to advance the record card in said transmitting mechanism one card column each time that said transmitting timing device is sent through a cycle, said encoding means comprising a plurality of relays selectively operable in response to impulses from said transmitting card reading device to condition simultaneously a plurality of electrical conductors respectively, interconnecting said encoding means and said plurality of transmitting dual series switching devices, said transmitting dual series switching devices each comprising, a thyratron tube having a pair of grids one of which is connected to said encoding device and the other of which is connected to said sequentially operated timing device, a blank column detecting device serially interconnected between said escape magnet and said transmitting timing device to permit the pulsing of said escape magnet only if at least one of the elements of said encoding means has been energized whereby electrical impulses are serially available at said message transmission medium in response to the simultaneous conditioning of the first of said grids and the sequential conditioning of the second of said grids of selected ones of said thyratron tubes.

9. An apparatus for duplicating statistical cards comprising a pair of identical devices each operable either to transmit or receive statistical record card information at any one time, program means operable in conjunction with said devices to condition the same to function either as a transmitter or as a receiver at any one time, each of said devices having record card reading and record card punching apparatus selectively operable in column by column cycles under the control of said programming means, and means interconnecting said devices to effect the duplication in card column cycles of the information in a record card located in said device acting as a transmitter in a second record card located in said device acting as a receiver irrespective of the distance separating said devices comprising, a message transmission medium, a plurality of transmitter switching devices serially interconnecting said record card reading means with said message transmission medium, a sequentially operated timing device in said transmitting device, means electrically interconnecting said timing device and said switching devices, means responsive to the cyclic operation of said card reading means for effecting the operation of said transmitter timing device through one cycle whereby electrical impulses are available at said message transmission medium in response to the conditioning of said transmitter switching devices, a plurality of receiver switching devices serially interconnecting said transmission medium with said apparatus programmed to act as a card punching device, a sequentially operated timing device in said receiver, means interconnecting said receiver timing device with said receiver switching devices, and means responsive to impulses over said transmission medium for initiating a cycle of said receiver sequentially operated timing device whereby for each card column read cycle at said apparatus programmed to act as a transmitter, electrical pulses are available through the switching devices of said apparatus programmed to act as a receiver to selectively energize said punch magnets at said receiver card punching machine for duplicating in said receiver record card the information in said transmitter record card in card column cycles.

10. An apparatus for duplicating statistical cards comprising, a pair of identical devices each operable either to transmit or receive statistical record card information at any one time, program means operable in conjunction with said devices to condition the same to function either as a transmitter or a receiver at any one time, each of said devices having record card reading and record card punching apparatus selectively operable in column by column cycles under control of said program means, each of said devices having card feed clutches operable under control of card feed magnets to advance a record card from a storage hopper to said card reading and card punching apparatus, and means interconnecting said devices to effect the duplication in card column cycles of the information contained in the record card located in said device acting as a transmitter in a second record card located in said device acting as a receiver irrespective of the distance separating said devices, comprising, a message transmission medium, a plurality of transmitter switching devices serially interconnecting said record card reading means with said message transmission medium, an encoding means for translating information in one column of said record card at said card reading means to a different code for transmission, said encoding means comprising a plurality of relays selectively operable in response to impulses from said transmitting card reading device to condition simultaneously a plurality of electrical conductors interconnecting said encoding means and a plurality of said transmitter switching devices, means responsive to the operation of said card reading means to condition for current conduction said transmitter switching devices whereby electrical impulses are available at said message transmission medium in response to the sequential conditioning of said switching devices, a decoding means for translating said transmittal code back to said statistical card code, means selectively energizing punch magnets in said card punching means in response to electrical impulses available through said decoding means, a plurality of receiver switching devices serially interconnecting said transmission medium with said decoding means, means interconnecting said receiver timing device with said receiver switching devices, said decoding means comprising a plurality of relays operable to translate said transmittal code to said statistical record card code, means responsive to the operation of said device acting as a transmitter for sending an end of card signal across said transmission medium and through said receiver decode device to energize the card feed clutch at said receiver to initiate a card feed cycle therein and simultaneously to send a start signal from said receiver back to said transmitter across said transmission medium provided said device acting as a receiver is in column registration with said device acting as a transmitter whereby for each card column read cycle at said transmission device, electrical pulses are available through said receiver switching devices to selectively energize said punch magnets at said receiver card punching machine for duplication in said receiver record card the information in said transmitter record card in card column cycles.

11. An apparatus for duplicating statistical cards comprising a pair of identical devices each operable either to transmit or receive statistical record information, program means operable in conjunction with said devices to condition the same to function either as a transmitter or a receiver at any one time, each of said devices having record card reading and record card punching means selectively operable in column by column cycles under control of said program means, each of said devices having card feed clutches operable under control of card feed magnets to advance record cards from a storage hopper to a card reading and card punching station, and means interconnecting said devices to effect the duplication in card column cycles of the information in a record card located at said device acting as a transmitter in a second record card located at said device acting as a receiver irrespective of the distance separating said devices, comprising, a message transmission medium, a plurality of transmitter switching devices serially interconnecting said record card reading means with said message transmission medium, an encoding means for translating information in one column of said record card at said card reading means to a different code for transmission, said encoding means comprising a plurality of relays selectively operable in response to impulses from said transmitting card reading means to condition simultaneously a plurality of electrical conductors interconnecting said encoding device and said transmitter switching devices, means responsive to the operation of said card reading means to condition for current conduction said transmitter switching devices, whereby electrical impulses are available at said message transmission medium in response to the conditioning of said switching devices, a decoding means for translating said transmittal code back to a statistical card code, means selectively energizing punched magnets in said card punch means in response to electrical impulses available through said decoding means, a plurality of receiver switching devices serially interconnecting said transmission medium with said card punching means, a sequentially operated timing device in said device acting as a receiver, means interconnecting said receiver timing device with said receiver switching devices, means responsive to impulses over said transmission medium to condition for current conduction said receiver switching devices, said decoding means comprising a plurality of relays, means responsive to the operation of said transmitting device for sending an end of card signal across said transmission medium and through said receiver decoding device to energize the card feed clutch at said device acting as a receiver to initiate a card feed cycle therein and simultaneously to send a start signal from said device acting as a receiver back to said device acting as a transmitter provided said device acting as a receiver device is in column registration with said transmitting device, and means in said decoding means for checking whether or not a good signal is available at said receiving device, said checking means comprising sending a pulse in response to the operation of said receiver sequentially operated timing device through the points of said relays of said decoding means whereby a signal will be available to energize said punch magnets in said receiving device only if said pulse can get through said code checking means to provide electrical pulses through said receiver switching devices and through said decoding means to selectively energize said punch magnets in said receiver card punching means for duplicating in said receiver record card the information contained in said transmitter record card in card column cycles.

12. An apparatus for duplicating statistical cards comprising, a transmitting device having means for reading information in a record card one column at a time, a receiving device having means for punching a record card column by column in response to energization of its punch magnets, and a message transmission means interconnecting said transmitting and receiving devices to effect the duplication of the information contained in a record card located at said transmitting device into a second card located at said receiving device comprising, a plurality of transmitter switching devices, a timing means in said transmitting device, means operating in synchronism with said card reading means for effecting a single cycle operation of said timing means, said timing means sequentially conditioning said transmitter switching devices to complete circuits whereby data read from a record card is serially impressed as pulses on said transmission means, a plurality of switching devices in said receiving device, a timing means in said receiving device, and means responsive to an impulse over said transmission means for initiating a cycle of said timing means, said timing means sequentially conditioning said receiver switching devices to complete circuits whereby pulses received over said transmission means are available to selectively energize said punch magnets at said card punching means for duplicating column by column in said record card at said receiving device, the information contained in said record card at said transmitting device.

13. An apparatus for duplicating statistical cards comprising, a transmitting device having means for reading information in a record card one column at a time, a receiving device having means for punching a record card column by column in response to energization of its punch magnets, and a message transmission means interconnecting said transmitting and receiving devices to effect the duplication of the information contained in a record card located at said transmitting device into a second card located at said receiving device comprising, a plurality of transmitter switching devices, an encoding means connected to said reading means for translating data read by said reader from a column of said card into a different code suitable for transmission, means interconnecting said encoding means with said switching devices, said encoding means being operable in response to impulses from said reader to simultaneously prepare said switching devices for current conduction, a timing means in said transmitting device sequentially conditioning said transmitter switching devices to complete circuits whereby data read from a record card is serially impressed as pulses on a said transmission means, a plurality of switching devices in said receiving device, a timing means in said receiving device, and means responsive to an impulse over said transmission means for initiating a cycle at said timing means, said timing means sequentially conditioning said receiver switching devices to complete circuits whereby pulses received over said transmission means are available to selectively energize said punch magnets at said card punching means for duplicating column by column in said record card at said receiving device the information contained in said record card at said transmitting device.

14. An apparatus for duplicating statistical cards comprising, a transmitting device having means for reading information in a record card one column at a time, a receiving device having means for punching a record card column by column in response to energization of its punch magnets, and a message transmission means interconnecting said transmitting and receiving devices to effect the duplication of the information contained in a record card located at said transmitting device into a second card located at said receiving device comprising, a plurality of transmitter switching devices, a timing means in said transmitting device sequentially conditioning said transmitter switching devices to complete circuits whereby data read from a record card is serially impressed as pulses on a said transmission means, a plurality of switching devices in said receiving device connected to said transmission means, a decoding means connected to said punch magnets for translating code transmitted over said transmission means back to statistical code, said decoding means being connected to said receiver switching devices, and a timing means in said receiving device for sequentially conditioning said receiver switching devices to complete circuits whereby pulses received over said transmission means are available through said decoding means to selectively energize said punch magnets at said card punching means for duplicating column by column in said record card in said receiving device, the information contained in said record card at said transmitting device.

15. An apparatus for transmitting statistical card data over a transmission medium comprising a card reading means operable to read data in a record card one column at a time, a plurality of switching devices, an encoding means connected to said reading means for translating information read by said reader from a column of said card into a different code suitable for transmission, means interconnecting said encoding means with said switching devices, said encoding means being operable in response to impulses from said reader to simultaneously prepare said switching devices for current conduction, a timing means for sequentially conditioning said switching devices, and means acting in timed relation to said card reading means for actuating said timing device through one cycle to complete circuits whereby said impulses are impressed on said message transmission medium in response to the completion of circuits through said switching devices.

16. An apparatus for transmitting statistical card data over a transmission medium comprising a card reading means operable to read data in a record card one column at a time, a card feed for advancing a card column by column, an escape magnet controlling said feed, a plurality of switching devices, an encoding means connected to said reading means for translating information read by said reader from one column of said card into a different code suitable for transmission, means interconnecting said encoding means with said switching devices, said encoding means comprising a plurality of relays operable in response to impulses from said reader to simultaneously prepare said switching devices for current conduction, a timing means for sequentially conditioning said switching devices to complete circuits whereby said impulses are impressed on said transmission medium in response to the conditioning of said switching devices, and a blank column detection device in series with said escape magnet and said timing means whereby operation of said escape magnet is prevented if none of said relays has been energized.

17. An apparatus for transmitting statistical card data over a transmission medium comprising a card reading means operable to read data in a record card one column at a time, a plurality of switching devices, an encoding means connected to said reading means, means for translating information read by said reader from a column of said card into a different code suitable for transmission, means interconnecting said encoding means with said switching devices, said encoding means being operable in response to impulses from said reader to simultaneously prepare said switching devices for current conduction, a timing means for sequentially conditioning said switching devices to complete circuits whereby said impulses are impressed on said transmission medium in response to the completion of circuits through said switching devices.

References Cited in the file of this patent

UNITED STATES PATENTS

| | | |
|---|---|---|
| 1,902,964 | Liesk et al. | Mar. 20, 1933 |
| 1,927,556 | Nelson | Sept. 19, 1933 |
| 2,069,000 | Bacon | Jan. 26, 1937 |
| 2,348,214 | Gubisch | May 9, 1944 |
| 2,468,462 | Rea | Apr. 26, 1949 |
| 2,471,126 | Spencer | May 24, 1949 |
| 2,578,185 | Halvorsen | Dec. 11, 1951 |
| 2,620,878 | Rabenda | Dec. 9, 1952 |
| 2,633,491 | Zentgraf | Mar. 31, 1953 |
| 2,641,641 | Edgar | June 9, 1953 |
| 2,667,533 | Zenner | Jan. 26, 1954 |
| 2,718,356 | Burrell | Sept. 20, 1955 |
| 2,757,864 | Pollard | Aug. 7, 1956 |
| 2,892,182 | Neff | June 23, 1959 |